(No Model.)

W. R. FOSTER.
PNEUMATIC TIRE.

No. 456,028. Patented July 14, 1891.

Witnesses:
C. Sedgwick
E. M. Clark

Inventor
W. R. Foster
by Munn & Co.
Attorneys

THE NORRIS PETERS CO., PHOTO-LITHO., WASHINGTON, D. C.

UNITED STATES PATENT OFFICE.

WILLIAM ROBERT FOSTER, OF LONDON, ENGLAND.

PNEUMATIC TIRE.

SPECIFICATION forming part of Letters Patent No. 456,028, dated July 14, 1891.

Application filed March 6, 1891. Serial No. 384,009. (No model.)

*To all whom it may concern:*

Be it known that I, WILLIAM ROBERT FOSTER, india-rubber manufacturer, of 87 Grange Road, Bermondsey, London, in the county of Surrey, England, have invented a new and useful Improvement in Pneumatic Tires, of which the following is a full, clear, and exact description.

My invention relates to what are known as "pneumatic tires" for bicycle and other wheels; and it has for its object to provide a valve which will effectually close the orifice at which air is forced into the tire and will admit of being slightly opened to relieve the internal pressure, to suit the requirements or fancy of the rider, should the inflation be excessive. It has been already proposed to provide such tires with a valve which closes automatically after the tire has been inflated, the said valve consisting of an inwardly-projecting nozzle of india-rubber provided with a narrow slit, which is caused to expand when the tire is being inflated, and closes automatically by the internal pressure when the tire is fully charged. Such a valve is not effectual for its intended purpose of preventing the escape of the air, which is liable to slowly leak out, thus necessitating frequent inflation of the tire, and the object of my invention is to remedy this defect; and to this end my invention consists in re-enforcing the valve by a circumferential band of india-rubber surrounding the nozzle, so as to cause the valve to close more quickly and effectually when the tire is fully inflated.

Reference is to be had to the accompanying drawings, forming part of this specification, wherein—

Figure 1:
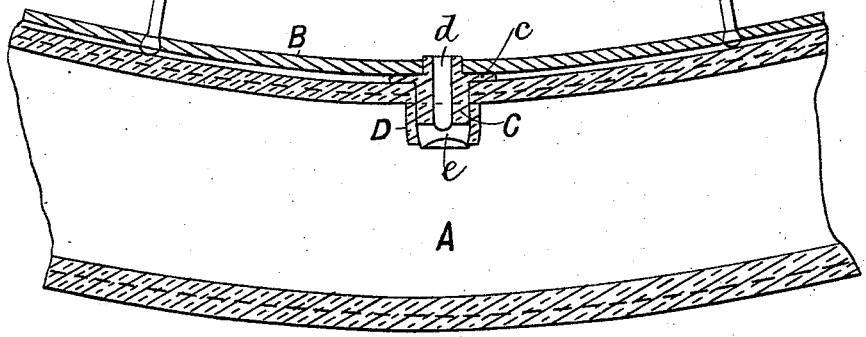
Figure 2:
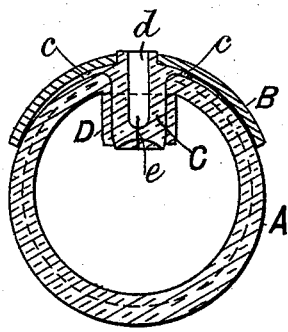
Figure 3:
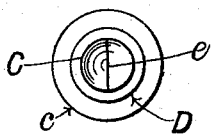

Figure 1 is a longitudinal and Fig. 2 a cross section of the part of the tire where the valve is situated, and Fig. 3 is an end view of the valve-nozzle.

A is the hollow rubber tire, B the metal rim, and C the valve-nozzle, inserted through a hole in the rubber tire so as to project internally therein, the nozzle being provided with a flange c, by which it is cemented to the rubber tire, said flange being held between the tire A and rim B, all in the usual way. The nozzle has a bore d, which projects through a hole in the rim B, to receive the delivery-nozzle of the air-pump, as usual, and at its inner projecting end the usual diametrical slit e, extending to the bore d. This inner end of the nozzle is slightly concave, as shown, and the part of the nozzle projecting within the tire is encircled by a band of india-rubber D, which is sprung onto the nozzle and cemented thereon after the slit e has been cut therein. As the slit e necessarily extends some little way up the sides of the nozzle in order to reach the bore d, the lips of the slit as usually made have but little tendency to close together, so that the valve is dependent to a great extent on the air-pressure within the tire for the maintenance of an effectual closure of the valve. By means of the band D a considerable constrictive force is exerted upon the slitted end, which holds the lips tightly closed together without the assistance of the air-pressure. At the same time the opening of the slit during inflation is permitted, while by temporarily inserting a wire or other instrument the slit may be opened to relieve the internal pressure.

Having now particularly described and ascertained the nature of the said invention and in what manner the same is to be performed, I declare that what I claim is—

In a pneumatic tire, the combination, with the herein-described valve-nozzle, of the circumferential re-enforcing or constricting elastic band, as and for the purpose specified.

The foregoing specification of my improvement in pneumatic tires signed by me this 13th day of February, 1891.

WILLIAM ROBERT FOSTER.

Witnesses:
 W. J. NORWOOD,
 THOMAS LAKE,
*Both of 17 Gracechurch St., London, E. C., Notary's Clerks.*